(12) United States Patent
Urano et al.

(10) Patent No.: US 6,914,100 B2
(45) Date of Patent: Jul. 5, 2005

(54) METHOD OF PRODUCING A CROSSLINKED POLYMER PARTICLE

(75) Inventors: Chisato Urano, Minamiashigara (JP); Yoshihiro Inaba, Minamiashigara (JP); Masato Mikami, Minamiashigara (JP); Takako Kobayashi, Minamiashigara (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 0 days.

(21) Appl. No.: 10/390,004

(22) Filed: Mar. 18, 2003

(65) Prior Publication Data

US 2004/0034174 A1 Feb. 19, 2004

(30) Foreign Application Priority Data

Aug. 15, 2002 (JP) .......................... 2002-236875

(51) Int. Cl.⁷ .................................. C08F 8/32
(52) U.S. Cl. .................. 525/374; 525/379; 525/382; 525/279
(58) Field of Search .................. 525/279, 374, 525/379, 382; 524/548; 436/528, 531, 533, 534, 541

(56) References Cited

U.S. PATENT DOCUMENTS

| | | | |
|---|---|---|---|
| 4,070,348 A | 1/1978 | Kräemer et al. | |
| 5,308,749 A | * 5/1994 | Sutton et al. | 435/5 |
| 6,203,956 B1 | 3/2001 | Urano et al. | |
| 6,413,691 B2 | 7/2002 | Daimon et al. | |
| 2004/0039109 A1 | 2/2004 | Urano et al. | |

FOREIGN PATENT DOCUMENTS

| | | | |
|---|---|---|---|
| JP | A 58-106554 | | 6/1983 |
| JP | A 58-219455 | | 12/1983 |
| JP | 64-033111 | * | 7/1987 |
| JP | A 63-90521 | | 4/1988 |
| JP | A 63-191805 | | 8/1988 |
| JP | 63-191805 | * | 8/1988 |
| JP | A 63-191818 | | 8/1988 |
| JP | A 64-33111 | | 2/1989 |
| JP | A 2-166102 | | 6/1990 |
| JP | A 4-323213 | | 11/1992 |
| JP | A 5-216049 | | 8/1993 |
| JP | A 10-310603 | | 11/1998 |
| JP | B2 3238736 | | 10/2001 |

* cited by examiner

Primary Examiner—Ling-Sui Choi
(74) Attorney, Agent, or Firm—Oliff & Berridge, PLC

(57) ABSTRACT

A crosslinked polymer particle can be obtained by carrying out a crosslinking reaction between a non-crosslinked polymer particle containing a succinimidoxycarbonyl group and a compound having two or more amino groups.

19 Claims, No Drawings

METHOD OF PRODUCING A CROSSLINKED POLYMER PARTICLE

BACKGROUND OF THE INVENTION

1. Field of the Invention

The present invention relates to a method of producing a crosslinked polymer particle.

2. Description of the Related Art

Polymer particles having a particle diameter ranging from 0.01 to 50 μm are useful as spacers, standard particles, diagnostic particles for inspection of antigen-antibody reaction, catalyst particles, combinatorial chemistry particles, toner additives, cosmetic additives, rheology control agents, low profile additives, improvers of mechanical characteristics of resins, antiblocking agents for resin films, lubricants for films, and running stabilizers for thermosensitive paper and are used in various fields.

In recent years, the performance demanded of polymer particles has ranged over various characteristics such as not only shape and uniformity of particle diameters, but also strength and heat resistance.

For instance, a spacer of a liquid crystal display is used to keep a constant clearance between two glass substrates constituting the display, and polymer particles are frequently used as the spacer (spacer particles). However, if a distribution of particle diameters of these polymer particles is wide, spacer particles having diameters smaller than a center particle diameter move within the space between the two glass substrates and tend to become unevenly distributed. Also, a problem arises in that spacer particles having diameters larger than the center particle diameter are easily broken. Specifically, if polymer particles obtained by the polymerization of only a monofunctional vinyl monomer such as styrene are used as a spacer, these polymer particles are easily broken or distorted by pressure when a clearance between two substrates is set because these particles generally have low mechanical strength.

In order to solve this problem, introducing a crosslinked structure into polymer particles has been proposed. If a polymer particle has a crosslinked structure, distortion of the particle due to heat is prevented, and since the polymer is also prevented from being dissolved when used in a solvent, the polymer particle can be widely used irrespective of whether the solvent is water or an organic solvent.

With regard to the production of polymer particles having a crosslinked structure, various methods are known. As a typical method, a method of introducing a crosslinked structure into a polymer particle by adding a crosslinking monomer, and specifically a polyfunctional monomer, to a polymerizable monomer has been proposed. Examples of a granulating method include emulsion polymerization and suspension polymerization. While emulsion polymerization makes it possible to obtain polymer particles having a good distribution of particle diameters, it is generally difficult to produce large particles having an average particle diameter of 1 μm or more.

Therefore, studies are being carried out to improve the distribution of the particle diameters of polymer particles. Japanese Patent Application Laid-Open (JP-A) Nos. 58-106554 and 63-191818 propose a so-called seed polymerization method in which polymer particles are first prepared by emulsion polymerization and then the polymer particles are used as a seed to carry on polymerization, thereby promoting growth of the particles to enlarge the particles. However, this seed polymerization method involves a production process with two or more steps and there has the drawbacks of inferior operability and economy.

As a method of producing polymer particles by one step, a method of producing monodispersion vinyl polymer particles by polymerizing one or more vinyl monomers in an organic solvent or a water/organic solvent in the presence of a specific dispersion stabilizer is disclosed, for example, in JP-A No. 63-191805. Further a method of producing a fine particle-like crosslinked type N-vinylcarboxylic acid amide resin having an average particle diameter of 10 μm or less by polymerizing one or more vinyl monomers in a non-aqueous solvent in the presence of a crosslinking agent is disclosed in JP-A Nos. 4-323213 and 10-310603.

However, the polymer particles obtained using the method described in JP-A No. 63-191805 have a wide particle size distribution and are therefore not necessarily satisfactory. Also, although an average particle diameter of the resulting resin fine particles is indicated in JP-A No. 4-323213, there is no disclosure as to a distribution of particle diameters. JP-A No. 10-310603 discloses polymer particles having such a narrow particle size distribution that a coefficient of variation is 2.28%. These particles, however, have an average particle diameter as small as 3 μm.

According to the findings of the inventors of the invention, in the case of using a polyfunctional vinyl monomer as a crosslinking monomer in a dispersion polymerization method performed in a non-aqueous solvent in the presence of a dispersion stabilizer, flocculation between particles occurs, and therefore, stable polymer dispersion cannot be obtained in many cases. It is therefore very difficult to obtain particles having an average particle diameter of 5 μm or more and a narrow distribution of particle diameters.

SUMMARY OF THE INVENTION

The present invention has been made to solve the above problems, and it is an object of the present invention to provide a method of obtaining polymer particles having a crosslinked structure and a good particle size distribution by using a simple process at a high yield.

Measures taken to solve the above problem are as follows.

A first aspect of the invention provides a method of producing a crosslinked polymer particle comprising the step of reacting a non-crosslinked polymer particle containing a succinimidoxycarbonyl group with a compound having two or more amino groups.

A second aspect of the invention provides a method of producing a crosslinked polymer particle according to the first aspect, wherein the non-crosslinked polymer particle is produced by polymerizing 0.1 to 100% by mole of a polymerizable monomer (A) containing a succinimidoxycarbonyl group and 99.9 to 0% by mole of a polymerizable monomer (B) containing one polymerizable moiety in the monomer, in a non-aqueous solvent in the presence of a macromolecular dispersion stabilizer by using an initiator. Here, the non-aqueous solvent is a solvent in which the polymerizable monomer (A) and the polymerizable monomer (B) are soluble and the non-crosslinked polymer particle is insoluble.

A third aspect of the invention provides a method of producing a crosslinked polymer particle according to the second aspect, wherein the polymerizable monomer (A) may be at least one type selected from the group consisting of N-acryloxysuccinimide and N-methacryloxysuccinimide.

A fourth aspect of the invention provides a method of producing a crosslinked polymer particle according to the first aspect, wherein preferably a number average particle diameter of the crosslinked polymer particle is 0.01 to 50 μm and a coefficient of variation of the number average particle diameter is 0.01 to 30%.

A fifth aspect of the invention provides a method of producing a crosslinked polymer particle according to the first aspect, wherein, more preferably, a number average particle diameter of the crosslinked polymer particle be 0.01 to 50 μm and a coefficient of variation of the number average particle diameter be 0.1 to 10%.

A sixth aspect of the invention provides a method of producing a crosslinked polymer particle according to the first aspect, wherein, most preferably, a number average particle diameter of the crosslinked polymer particle be 0.01 to 50 μm and a coefficient of variation of the number average particle diameter be 0.5 to 5%.

DESCRIPTION OF THE INVENTION

A method of producing a crosslinked polymer particle according to the present invention comprises the step of reacting a non-crosslinked polymer particle containing a succinimidoxycarbonyl group with a compound having two or more amino groups. The production method ensures that the crosslinked polymer particle in the invention can be obtained at a high yield by a simple process.

The invention will be explained in detail hereinbelow.
Non-Crosslinked Polymer Particle The non-crosslinked polymer particle containing a succinimidoxycarbonyl group used in the invention is preferably produced by polymerizing a polymerizable monomer (A) containing a succinimidoxycarbonyl group and a polymerizable monomer (B) containing one polymerizable moiety in the monomer in a non-aqueous solvent in the presence of a macromolecular dispersion stabilizer by using an initiator. As the non-aqueous solvent in this case, a solvent is used in which the polymerizable monomer (A) and the polymerizable monomer (B) are soluble and the non-crosslinked polymer particle is insoluble. Use of the non-crosslinked polymer particle obtained by the above method makes it possible to obtain a crosslinked polymer particle according to the invention with a good particle size distribution.

Although any monomer may be used as the polymerizable monomer (A) without any particular limitation as long as it is a monomer containing a succinimidoxycarbonyl group and one radically polymerizable unsaturated group in a molecule thereof, among these monomers, N-acryloxysuccinimide and N-methacryloxysuccinimide are preferable because N-acryloxysuccinimide and N-methacryloxysuccinimide can be synthesized easily.

These polymerizable monomers (A) may be used either singly or in combinations of two or more.

As the polymerizable monomer (B), a polymerizable monomer containing one polymerizable moiety in its molecule may be used. Specific examples of the polymerizable monomer (B) include monomers of styrene types such as styrene, methylstyrene, ethylstyrene, chlorostyrene, styrenesulfonic acid and t-butoxystyrene; monomers of (meth)acrylic ester types such as methyl acrylate, methyl methacrylate (hereinafter acryl and methacryl are both represented by the term "(meth)acryl", ethyl (meth)acrylate, n-propyl (meth)acrylate, i-propyl (meth)acrylate, n-butyl (meth)acrylate, 2-ethylhexyl (meth)acrylate, lauryl (meth)acrylate, glycidyl (meth)acrylate, dimethylaminoethyl (meth)acrylate, hydroxyethyl (meth)acrylate, diethylene glycol mono(meth)acrylate, polyethylene glycol mono (meth)acrylate and butanediol mono(meth)acrylate; monomers of unsaturated carboxylic acid types such as (meth)acrylic acid and maleic acid; monomers of alkyl vinyl ether types such as methyl vinyl ether and ethyl vinyl ether; monomers of vinyl ester types such as vinyl acetate and vinyl butyrate; monomers of (meth)acrylamide types such as (meth)acrylamide, N-methyl(meth)acrylamide and N-ethyl (meth)acrylamide; and monomers of nitrile types such as (meth)acrylonitrile.

Among these polymerizable monomers (B), methyl methacrylate is preferably exemplified. These polymerizable monomers (B) may be used either singly or in combinations of two or more.

As to the ratio of the polymerizable monomer (A) to the polymerizable monomer (B) to be compounded when producing the non-crosslinked polymer particle, it is preferable that the polymerizable monomer (A) be 0.1 to 100% by mole and the polymerizable monomer (B) be 99.9 to 0% by mole, it is more preferable that the polymerizable monomer (A) be 0.1 to 50% by mole and the polymerizable monomer (B) be 99.9 to 50% by mole and it is most preferable that the polymerizable monomer (A) be 0.1 to 20% by mole and the polymerizable monomer (B) be 99.9 to 80% by mole.

When two or more compounds are used together as the polymerizable monomer (A) or as the polymerizable monomer (B), the ratio of the polymerizable monomer (A) to the polymerizable monomer (B) to be compounded means the ratio of the number of the total mols of the polymerizable monomer (A) to the number of the total mols of the polymerizable monomer (B).

As the macromolecular dispersion stabilizer (hereinafter abbreviated as a dispersion stabilizer as the case may be) to be used in the invention, any material may be used as long as it is a macromolecular dispersion stabilizer. However, a macromolecular dispersion stabilizer having a weight average molecular weight of 10,000 to 2,000,000 is used. Specific examples of the macromolecular dispersion stabilizer include a polyvinyl alcohol, partially saponified polyvinyl acetate, polyvinyl pyrrolidone, polyvinyl acetamide, poly(meth)acrylic acid, poly(meth)acrylate, poly(meth)acrylic acid poly(meth)acrylic ester copolymer, poly(meth)acrylic acid.vinyl ether copolymer, polyvinyl alkyl ether, poly(meth)acrylic acid.styrene copolymer, polystyrenesulfonic acid, and further, celluloses such as methyl cellulose, ethyl cellulose, hydroxyethyl cellulose, hydroxypropyl cellulose and carboxymethyl cellulose.

Among these compounds, polyvinyl pyrrolidone, hydroxypropyl cellulose, polyvinyl acetamide, polyvinyl alkyl ether, polyvinyl alcohol and partially saponified polyvinyl acetate are preferable. The macromolecular dispersion stabilizer may be used either singly or in combinations of two or more.

The amount of the dispersion stabilizer to be added is preferably 0.1 to 25% by mass and particularly preferably 0.5 to 15% by mass based on the total amount of the non-aqueous solvent.

When producing the aforementioned non-crosslinked polymer particle, various surface active agents may be further added. Specific examples of these surface active agents include anionic surface active agents such as sodium dodecylbenzenesulfonate, sodium laurylsulfate and sodium alkyldiphenyldisulfonate and nonionic surface active agents such as polyoxyethylene nonylphenyl ether.

The amount of the surface active agent to be added is preferably 0 to 25% by mass and particularly preferably 0 to 15% by mass based on the total amount of the non-aqueous solvent.

When producing the aforementioned non-crosslinked polymer particle, a redox type compound may be further added. Any compound may be used as the redox type compound to be used without any particular limitation as long as it has oxidizing and reducing ability. Examples of the redox type compound include ascorbic acid, isoascorbic acid, tocopherol, hydroquinone, catechol and resorcin. The amount of the redox type compound to be used is usually 0 to 10.0 parts by mass and preferably 0 to 5.0 parts by mass based on 100 parts by mass of the total amount of the polymerizable monomer.

As the initiator to be used in the invention, any radical initiator soluble in the non-aqueous solvent which will be described later may be used without any particular limitation. Typical examples of the initiator include peroxides such as t-butyl peroxide, t-amyl peroxide, cumyl peroxide, acetyl peroxide, propionyl peroxide, benzoyl peroxide, lauroyl peroxide, t-butyl hydroperoxide, cyclohexyl hydroperoxide, t-butyl peracetate and t-butyl perbenzoate; and azo compounds such as 2,2'-azobisisobutyronitrile (AIBN), dimethyl-2,2'-azobisisobutyrate, 2,2'-azobis(2,4-dimethylvaleronitrile) and 2,2'-azobis[2-methyl-N-(2-hydroxyethyl)-propionamide].

These initiators are used in an amount of usually 0.01 to 50 parts by mass and preferably 0.1 to 10 parts by mass based on 100 parts by mass of the total amount of the polymerizable monomers.

As the non-aqueous solvent used in the invention, a solvent in which the aforementioned polymerizable monomers as the raw material are soluble and the aforementioned non-crosslinked polymer particle as the product is insoluble is usually used. Examples of the non-aqueous solvent include alcohols having 1 to 6 carbon atoms, ketones, esters and cellosolves.

Examples of the alcohols having 1 to 6 carbon atoms include methanol, ethanol, iso-propyl alcohol, n-propyl alcohol, iso-butyl alcohol, sec-butyl alcohol, tert-butyl alcohol, isoamyl alcohol, sec-amyl alcohol or tert-amyl alcohol.

Examples of the ketones include acetone and methyl ethyl ketone. Examples of the esters include ethyl acetate and butyl acetate. Further, examples of the cellosolves include methyl cellosolve, ethyl cellosolve, propyl cellosolve and butyl cellosolve.

Among these compounds, methanol is preferably used.

In the polymerization reaction in the invention, the non-aqueous solvents may be used either singly or in combinations of two or more.

The non-crosslinked polymer particle is produced by polymerizing the aforementioned polymerizable monomers by using the foregoing initiator in the foregoing non-aqueous solvent in the presence of the foregoing macromolecular dispersion stabilizer. The polymerization first proceeds in the solution prepared by dissolving the polymerizable monomers in a solvent. Along with the progress of the polymerization, the produced non-crosslinked polymer particle starts precipitating from the solvent.

The temperature during polymerization is in the range usually of 20 to 120° C. and preferably of 50 to 100° C. If oxygen is present in a large amount in the polymerization reaction system, the polymerization reaction is affected by oxygen, which makes it difficult to obtain a specified fine sphere polymer particle in a well-reproduced manner. It is therefore desirable to substitute the atmosphere in the system with inert gas such as nitrogen as thoroughly as possible and also to handle the polymer raw materials in an inert gas atmosphere.

In the aforementioned polymerization condition, a spherical copolymer containing a succinimidoxycarbonyl group and having a particle form of a true sphere and a very narrow distribution of particle diameter is obtained. As to the particle characteristics of the obtained non-crosslinked polymer particle, the number average particle diameter is usually 0.01 to 50 μm and preferably 0.01 to 20 μm and the coefficient of variation of the number average particle diameter, which is an index of the distribution of particle diameter, is 0.01 to 30%, preferably 0.1% to 10% and more preferably 0.5% to 5%.

Here, the coefficient of variation was calculated by obtaining the standard deviation (μm), which is known as an index of the distribution of particle diameter, on the basis of the data of the number average particle diameter, dividing the standard deviation by the number average particle diameter, and multiplying the resulting value by 100. The standard deviation (μm) has a unit of length and is affected by the magnitude of the number average particle diameter, whereas the coefficient of variation is not affected by the magnitude of the number average particle diameter.

Crosslinked Polymer Particle

The non-crosslinked polymer particle obtained in the above method is reacted with a compound having two or more amino groups (hereinafter referred to as an amino compound as the case may be) to thereby obtain a crosslinked polymer particle according to the invention. Here, the compound having two or more amino groups means compounds having two or more primary or secondary amines in one molecule. Examples of these compounds include aliphatic compounds, alicyclic compounds or aromatic compounds having two or more primary or secondary amines.

Any compound may be used as the aforementioned amino compound without any problem as long as it is a compound having two or more primary or secondary amines in one molecule. Examples of the amino compound include aliphatic amino compounds such as polyalkylenepolyamines (e.g., ethylene diamine and 1,6-hexamethylenediamine), adipicdihydrazide, diethylenetriamine, triethylenetetramine, tetraethylenepentamine, dipropylenetriamine and N-methylpropylenediamine; alicyclic amino compounds such as 1-amino-3,3,5-trimethyl-5-aminomethylcyclohexane (isophoronediamine), 1,4-diaminocyclohexane, bis-(4-aminocyclohexyl)-methane, piperazines (e.g., piperazine, N-aminoethylpiperazine and N-aminopropylpiperazine); polyether polyamines (e.g., polyoxypropylenediamine having an amino group at both terminals) having a molecular weight of 200 to 2,000; polyamidopolyamine compounds containing many active amino groups in one molecule which compounds are obtained by the condensation of an aliphatic polycarboxylic acid, a polyalkylenepolyamine and as required, an aliphatic monocarboxylic acid; and aromatic amino compounds such as methaphenylenediamine, 4,4'-diaminodiphenylmethane and 4,4'-diaminodiphenylsulfone.

Among these compounds, ethylene diamine and diethylenetriamine are preferable. The amino compound may be used either singly or in combinations of two or more.

The amino compound is preferably added in an amount of 1/1000 or more based on the mass of the aforementioned non-crosslinked polymer particle.

Making the amount of the amino compound fall in the above range ensures that the succinimidoxycarbonyl group contained in the non-crosslinked polymer particle is reacted and crosslinked with the amino compound whereby a crosslinked polymer particle having superb heat resistance, pressure resistance and the like can be obtained.

As the solvent used in the reaction between the non-crosslinked polymer particle and the amino compound, a solvent in which the non-crosslinked polymer particle is insoluble and which does not react with the succinimidoxycarbonyl group is used.

Examples of the solvent include alcohols having 1 to 6 carbon atoms, ketones, esters or cellosolves though any solvent may be used without any problem as long as it is a non-aqueous solvent.

Examples of the alcohols having 1 to 6 carbon atoms include alcohols such as methanol, ethanol, iso-propyl alcohol, n-propyl alcohol, iso-butyl alcohol, sec-butyl alcohol, tert-butyl alcohol, iso-amyl alcohol, sec-amyl alcohol or tert-amyl alcohol.

Also, examples of the ketones include acetone and methyl ethyl ketones. Examples of the esters include ethyl acetate and butyl acetate. Further, examples of the cellosolves include methyl cellosolve, ethyl cellosolve, propyl cellosolve or butyl cellosolve. Hexanes or the like may also be used.

Among these compounds, methanol and ethanol are preferable. The solvent may be used either singly or in combinations of two or more.

The foregoing crosslinked polymer particle is produced by reacting the aforementioned non-crosslinked polymer particle with the aforementioned amino compound in a non-aqueous solvent with stirring. The reaction proceeds rapidly in a mild condition and is finished at room temperature in about one hour.

It is to be noted that, in the invention, the number average particle diameter, standard deviation and coefficient of variation of the crosslinked polymer particle obtained by a crosslinking reaction are almost the same as those of the raw material non-crosslinked polymer particle.

EXAMPLES

Examples in the present invention will be shown hereinbelow. These examples are instances for explanations and the invention is not limited at all by the following examples.

(1) Measurement of particle diameter and calculation of number average particle diameter: the particle diameter of the polymer particle was measured from a photograph taken by an optical microscope. Further, individual particle diameters of optionally selected 200 particles were measured to calculate the number average particle diameter.

(2) Calculation of standard deviation and the coefficient of variation: the standard deviation ($\mu$m), which is an index of the distribution of particle diameter, was found based on the data of particle diameter obtained above. Next, the standard deviation was divided by the number average particle diameter and the resulting value was multiplied by 100 to calculate the dimensionless coefficient of variation (%).

(3) Analysis of the composition of the polymer particle: the composition of the polymer particle was analyzed by $^1$H NMR (300 MHz, manufactured by Varian). As the solvent for the measurement, $CDCl_3$ was used.

Example 1
<Production of a Succinimidoxycarbonyl Group-Containing Non-Crosslinked Polymer Particle>

Using, as a reactor, a separable type four-neck Pyrex (R) glass flask having a capacity of 300 ml, the reactor was equipped with a cooling pipe provided with a nitrogen exhaust pipe at the upper section thereof and with a nitrogen gas introduction pipe. The stirring was carried out using an iron stirring rotor coated with Teflon (R) and an electromagnetic stirrer. The reactor was located in an oil bath.

The reactor in which the atmosphere was substituted with nitrogen was charged with 75 g of a methanol solution containing 2.2% by mass of a polyvinyl pyrrolidone (PVP) having a molecular weight (Mw) of 360,000 as a macromolecular dispersion stabilizer. Next, 21 g (90% by mole) of methyl methacrylate (MMA) refined by vacuum distillation, 4.0 g (10% by mole) of N-acryloxysuccinimide (AS) and 0.25 g of azobisisobutyronitrile (AIBN) as an initiator were poured in this order into the reactor. Nitrogen gas was blown into the liquid phase through the nitrogen gas introduction pipe for 2 hours with stirring to remove dissolved oxygen. Next, the nitrogen gas introduction pipe for introducing the nitrogen gas into the liquid phase was replaced with a nitrogen gas introduction pipe for introducing the nitrogen gas into the gas phase. The reaction was continued at a reaction temperature of 55° C. for 6 hours while nitrogen gas was introduced.

As a consequence, a non-crosslinked polymer particle having a number average particle diameter of 6.1 $\mu$m was obtained at a yield of 91% by mass. The standard deviation, which was an index of the distribution of particle diameter, and coefficient of variation of the non-crosslinked polymer particle were 1.3 $\mu$m and 23%, respectively. As a result of component analysis by $^1$H NMR, the composition ratio of the non-crosslinked polymer particle was as follows: MMA:AS=90:10 which accorded to the mole ratio when the raw material was charged.

<Crosslinking Reaction>

A 500 ml of beaker was charged with 10 g of the succinimidoxycarbonyl group-containing non-crosslinked polymer particle produced in the above method and 200 ml of methanol. 20 ml of ethylene diamine was added to the mixture while the mixture was stirred using a mechanical stirrer. The resulting mixture was stirred at a reaction temperature of 25° C. for 30 minutes.

After the mixture was stirred for 30 minutes, the particles were separated from the solution by using a Kiriyama funnel (filter paper: 5B). A 500 ml beaker was charged with the particles and 100 ml of methanol and the mixture was stirred for 10 minutes. Then, the particles were washed on a filter. This washing was repeated twice.

The particles that had undergone the crosslinking reaction were poured into THF and $CHCl_3$, but were not dissolved. It was therefore found that the particles had a crosslinked structure. Also, the yield of the crosslinked polymer particle was 95% by mass.

The number average particle diameter, standard deviation and coefficient of variation of the crosslinked polymer particle obtained by the crosslinking reaction are almost the same as those of the raw material non-crosslinked polymer particle.

Comparative Example 1

When the succinimidoxycarbonyl group-containing non-crosslinked polymer particles obtained in Example 1 were poured into THF and $CHCl_3$, these particles were dissolved. It was therefore found that the particles had no crosslinked structure.

Comparative Example 2

A stainless cup having a capacity of 500 ml was charged with 100 g of a 1% by mass polyvinyl alcohol solution, 23 g (95% by mole) of methylmethacrylate (MMA), 2.9 g (5% by mole) of divinylbenzene and 0.25 g of azobisisobutyronitrile (AIBN) as an initiator. The mixture was emulsified using a homogenizer at 10000 rpm for 3 minutes to obtain an emulsion solution. Next, the emulsion solution was transferred to a separable type four-neck Pyrex (R) glass flask having a capacity of 300 ml. Nitrogen gas was blown in the liquid phase through the nitrogen gas introduction pipe for 2 hours with stirring to remove dissolved oxygen. Next, the nitrogen gas introduction pipe for introducing the nitrogen gas into the liquid phase was replaced with a nitrogen gas introduction pipe for introducing the nitrogen gas into the gas phase. The reaction was continued at a reaction temperature of 60° C. for 16 hours with introducing nitrogen gas.

As a consequence, a polymer particle having a number average particle diameter of 2.2 µm was obtained at a yield of 95% by mass. The particles were poured into THF and CHCl$_3$, but were not dissolved. It was therefore found that the particles had a crosslinked structure. The standard deviation, which was an index of the distribution of particle diameter, and coefficient of variation of the crosslinked polymer particle were 8.6 µm and 115%, respectively and the particles had therefore a wide distribution.

According to the invention, a crosslinked polymer particle having a narrow distribution of particle diameter can be obtained using a simple method at a high yield.

What is claimed is:

1. A method of producing a crosslinked polymer particle comprising the step of reacting a non-crosslinked polymer particle containing a succinimidoxycarbonyl group with a compound having two or more amino groups, wherein the compound having two or more amino groups is at least one type selected from the group consisting of ethylenediamine, 1,6-hexamethylenediamine, adipicdihydrazide, diethylenetriamine, triethylenetetramine, tetraethylenepentamine, dipropylenetriamine, N-methyl-propylenediamine, 1-amino-3,3,5-trimethyl-5-aminomethylcyclohexane (isophoronediamine), 1,4-diaminocyclohexane, bis-(4-aminocyclohexyl)-methane, piperazine, N-aminoethylpiperazine, N-aminopropylpiperazine, methaphenylenediamine, 4,4'-diamino-diphenylmethane and 4,4'-diaminodiphenylsulfone.

2. A method of producing a crosslinked polymer particle according to claim 1, wherein the compound having two or more amino groups is at least one type selected from the group consisting of ethylene diamine and diethylenetriamine.

3. A method of producing a crosslinked polymer particle according to claim 1, wherein the step is carried out in at least one solvent selected from the group consisting of methanol and ethanol.

4. A method of producing a crosslinked polymer particle according to claim 1, wherein:
the non-crosslinked polymer particle is produced by polymerizing 0.1 to 100% by mole of a polymerizable monomer (A) containing a succinimidoxycarbonyl group and 99.9 to 0% by mole of a polymerizable monomer (B) containing one polymerizable moiety in the monomer, in a non-aqueous solvent in the presence of a macromolecular dispersion stabilizer by using an initiator; and
the non-aqueous solvent is a solvent in which the polymerizable monomer (A) and the polymerizable monomer (B) are soluble and the non-crosslinked polymer particle is insoluble.

5. A method of producing a crosslinked polymer particle according to claim 4, wherein the polymerizable monomer (A) is at least one type selected from the group consisting of N-acryloxysuccinimide and N-methacryloxysuccinimide.

6. A method of producing a crosslinked polymer particle according to claim 4, wherein the polymerizable monomer (B) is methyl methacrylate.

7. A method of producing a crosslinked polymer particle according to claim 4, wherein the non-aqueous solvent is methanol.

8. A method of producing a crosslinked polymer particle according to claim 4, wherein a weight average molecular weight of the macromolecular dispersion stabilizer is 10,000 to 2,000,000.

9. A method of producing a crosslinked polymer particle according to claim 4, wherein the macromolecular dispersion stabilizer is at least one type selected from the group consisting of polyvinyl pyrrolidone, hydroxypropyl cellulose, polyvinylacetamide, polyvinyl alkyl ether, polyvinyl alcohol and partially saponified polyvinyl acetate.

10. A method of producing a crosslinked polymer particle according to claim 4, wherein a surface active agent is further added to the non-aqueous solvent.

11. A method of producing a crosslinked polymer particle according to claim 4, wherein a redox type compound is further added to the non-aqueous solvent.

12. A method of producing a crosslinked polymer particle according to claim 4, wherein an amount of the polymerizable monomer (A) is 0.1 to 50% by mole and an amount of the polymerizable monomer (B) is 99.9 to 50% by mole.

13. A method of producing a crosslinked polymer particle according to claim 4, wherein an amount of the polymerizable monomer (A) is 0.1 to 20% by mole and an amount of the polymerizable monomer (B) is 99.9 to 80% by mole.

14. A method of producing a crosslinked polymer particle according to claim 4, wherein the polymerization is carried out in an inert gas atmosphere.

15. A method of producing a crosslinked polymer particle according to claim 4, wherein the polymerization is carried out at 50 to 100° C.

16. A method of producing a crosslinked polymer particle according to claim 4, wherein the polymerizable monomer (A) is 10% by mole of N-acryloxysuccinimide, the polymerizable monomer (B) is 90% by mole of methylmethacrylate, the non-aqueous solvent is methanol, the macromolecular dispersion stabilizer is polyvinyl pyrrolidone and the initiator is azobisisobutyronitrile.

17. A method of producing a crosslinked polymer particle according to claim 1, wherein a number average particle diameter of the crosslinked polymer particle is 0.01 to 50 mm and a coefficient of variation of the number average particle diameter is 0.01 to 30%.

18. A method of producing a crosslinked polymer particle according to claim 1, wherein a number average particle diameter of the crosslinked polymer particle is 0.01 to 50 mm and a coefficient of variation of the number average particle diameter is 0.1 to 10%.

19. A method of producing a crosslinked polymer particle according to claim 1, wherein a number average particle diameter of the crosslinked polymer particle is 00.1 to 50 nm and a coefficient of variation of the number average particle diameter is 0.5 to 5%.

* * * * *